US011567697B2

(12) United States Patent
Sasson et al.

(10) Patent No.: US 11,567,697 B2
(45) Date of Patent: Jan. 31, 2023

(54) PRIORITIZATION OF STORED DATA DURING A DELETE PROCESS IN A VIRTUALIZED STORAGE SYSTEM

(71) Applicant: International Business Machines Corporation, Armonk, NY (US)

(72) Inventors: Ben Sasson, North Baddesley (GB); Paul Nicholas Cashman, Alton (GB); Gemma Izen, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 17/095,918

(22) Filed: Nov. 12, 2020

(65) Prior Publication Data

US 2022/0147272 A1 May 12, 2022

(51) Int. Cl.
*G06F 3/06* (2006.01)

(52) U.S. Cl.
CPC .......... *G06F 3/0659* (2013.01); *G06F 3/0613* (2013.01); *G06F 3/0644* (2013.01); *G06F 3/0652* (2013.01); *G06F 3/0673* (2013.01)

(58) Field of Classification Search
CPC .... G06F 3/0659; G06F 3/0613; G06F 3/0644; G06F 3/0652; G06F 3/0673
See application file for complete search history.

(56) References Cited

U.S. PATENT DOCUMENTS

| 8,595,385 | B1 * | 11/2013 | Shapiro | G06F 13/385 710/52 |
| 10,976,965 | B1 * | 4/2021 | Houlemarde | G06F 3/0659 |
| 11,106,386 | B1 * | 8/2021 | Sun | G06F 16/2455 |
| 2013/0018852 | A1 | 1/2013 | Barton | |
| 2014/0280323 | A1 * | 9/2014 | Seales | G06F 16/2471 707/770 |

(Continued)

FOREIGN PATENT DOCUMENTS

WO 2016186602 A1 11/2016

OTHER PUBLICATIONS

"Fingerprinting Host IO Storage Hints and Apply Hints to Other Non-Hinting Volumes", An IP.com Prior Art Database Technical Disclosure, Authors et. al.: Disclosed Anonymously, IP.com No. IPCOM000259515D, IP.com Electronic Publication Date: Aug. 16, 2019, 2 pages.

(Continued)

*Primary Examiner* — Jason W Blust
(74) *Attorney, Agent, or Firm* — Stephen R. Yoder

(57) ABSTRACT

A method, computer program product and computer system are provided. A processor receives a host input/output write operation, wherein the host input/output write operation includes host metadata regarding data represented by the host input/output write operation. The processor stores the host input/output write operation in one or more physical storage data units. A processor assigns a priority to the one or more physical storage data units. In response to receiving a host volume delete command associated with at least one of the one or more physical storage data units, a processor prioritizes data units of the host volume for deletion based, at least in part, on the assigned priority of the data units of the host volume, wherein data units with a lower priority are permanently deleted before data units with a higher priority.

17 Claims, 8 Drawing Sheets

(56) References Cited

U.S. PATENT DOCUMENTS

2016/0371500 A1* 12/2016 Huang ................ G06F 21/6218
2018/0107592 A1*  4/2018 Hashimoto ........... G06F 3/0619
2019/0339873 A1   11/2019 Mainali
2019/0369875 A1* 12/2019 Meiri ...................... G06F 3/067
2020/0110537 A1*  4/2020 Hahn ...................... G06F 3/061

OTHER PUBLICATIONS

Mell et al., "The NIST Definition of Cloud Computing", National Institute of Standards and Technology, Special Publication 800-145, Sep. 2011, 7 pages.

* cited by examiner

PRIORITIZATION OF STORED DATA DURING A DELETE PROCESS IN A VIRTUALIZED STORAGE SYSTEM

BACKGROUND OF THE INVENTION

The present invention relates generally to the field of virtualized storage systems, and more particularly to prioritization of stored host metadata during a delete process.

Virtualized storage systems store data on physical media in a manner that is transparent to host servers. From the perspective of a host server, data is stored on virtual storage devices that are commonly known as logical volumes. Data storage systems map logical volumes to addressable physical locations on storage media, such as hard disks. Host servers typically require large numbers of volumes in order to store large amounts of data.

In conventional system storage architectures, data is stored in logical structures on one or more logical volumes and are accessed with the assistance of logical addresses, or "pointers," associated with the logical structures. When a data set is deleted, the pointers to the data set are destroyed and access to the user data is lost. The physical storage extents where the data was actually stored may then be reclaimed by a garbage collection process.

SUMMARY

Embodiments of the present invention provide a method, system, and program product to prioritize data during deletion. A processor receives a host input/output write operation, wherein the host input/output write operation includes host metadata regarding data represented by the host input/output write operation. The processor stores the host input/output write operation in one or more physical storage data units. A processor assigns a priority to the one or more physical storage data units. In response to receiving a host volume delete command associated with at least one of the one or more physical storage data units, a processor prioritizes data units of the host volume for deletion based, at least in part, on the assigned priority of the data units of the host volume, wherein data units with a lower priority are permanently deleted before data units with a higher priority.

DETAILED DESCRIPTION

Figure 1:
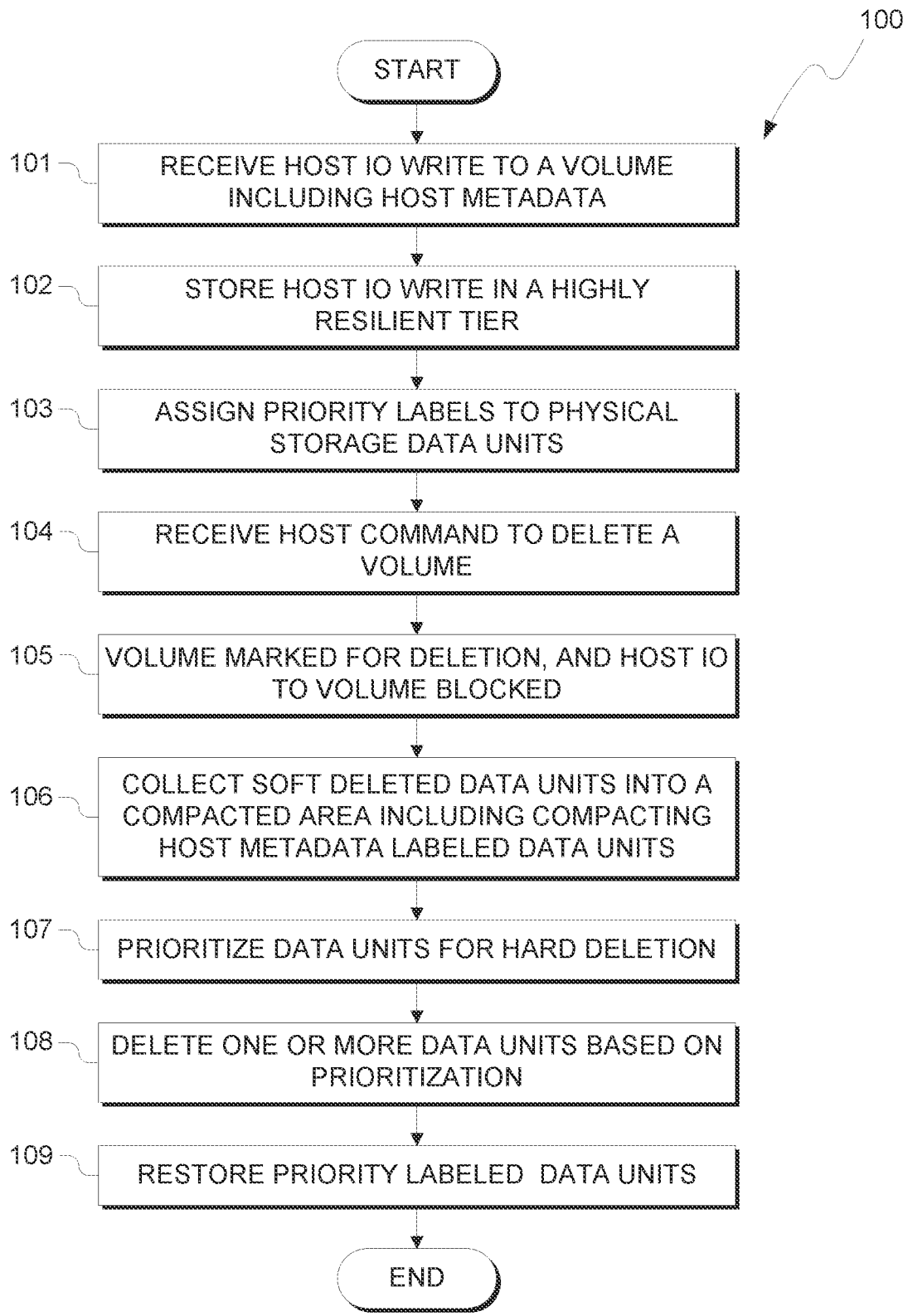
FIG. 1 is a flow diagram of an example embodiment of a method in accordance with the present invention.

In various embodiments, a file system, such as one maintained by a file server, contains metadata to keep track of which blocks are available to store new data and which blocks contain valid data that must not be overwritten. When a file is deleted in the file system, the metadata associated with the file is updated to indicate that file's blocks are free and can be overwritten with incoming write operations to the file system. To the file system, these metadata updates conventionally appear no different from any other writes being performed to the storage controller. When a data set is deleted, the physical storage extents are reclaimed without any distinction being made as to the content of the physical storage.

A method and system are provided at a storage controller of a virtualized storage system for prioritizing host metadata against deletion from physical storage extents during a delete process. Host metadata is data regarding the information being stored on a file system such as address ranges, dependencies to other data blocks and various other information regarding the data being stored on the file system. The described method and system provide a way to retain the host metadata, or other critical data as deemed necessary by the host, during a delete process over less important data. By doing so, embodiments of the present invention provide improvements to data retention of file systems while increasing storage capabilities of the file system by prioritizing data for permanent or hard deletion.

In the described method, when a host server writes host metadata (for example, file system structure), the host indicates that the data is host metadata and that the data is prioritized for retention or to be permanently deleted after other lower priority units have been deleted, i.e., last deletion. The storage controller in a virtualized storage system receiving a host input/output write operation including an indication that the write relates to host metadata or is prioritized for last deletion, labels physical storage data units of data of the write as being prioritized to be kept during a delete process compared to unlabeled data units. When carrying out a delete process to free physical storage space, the labeled data units are accordingly prioritized compared to data units that are not labeled.

A virtualized data storage system stores volumes of data in virtual and physical address spaces. Each data volume comprises a number of units of data which are contiguous in virtual address space but are generally fragmented in physical address space. The storage system includes a plurality of physical data storage devices on which the data units are stored according to a physical address space and a data storage controller that is operable to manage a virtual address space and its mapping to the physical address space.

The data storage controller is configured to implement a delete command received from a host, such as a personal computer or a server. In various scenarios and embodiments, the delete command is initiated by a soft delete cleanup command in which the volume's data units are marked for deletion and host input/output operations are blocked. In response the soft delete command, the storage controller performs a compaction operation in which the data units of the to-be-deleted volume are gathered together in physical address space. Then the storage controller performs a hard-delete operation (or permanent delete operation) in which the virtual and physical address space is de-allocated from the used storage space. The delete hard-delete operation is prioritized using the described method to ensure that host metadata is the last data to be hard-deleted from a volume's data.

Once a deletion occurs, embodiments of the present invention perform a coalescing or contracting operation occurs which identifies similar types of data units, based on the host metadata, so that similar data units will reside in the same extents of the storage. When a decision occurs that an extent of physical storage needs to be discarded (for example, due to space limitations or considerations), the method will prioritize not to discard extents containing host metadata. By doing so, if a command to restore or reverse a deletion is received, the storage system is capable of being able to present the host with a coherent metadata structure even if some of the data has already been discarded or permanently deleted.

FIG. 1 illustrates operational processes, generally designated 100, of storage controller of in a storage system. In process 101, a host input/output write operation to a volume including host metadata. Host metadata is metadata relating to the host file system structure. A host file system contains metadata to keep track of which blocks are available to store new data and which blocks contain valid data that must not be overwritten. When a file is deleted in the host file system, the file system metadata is updated to mark that file's blocks as free space. Typically, storage systems do not write over or otherwise alter the data to be deleted. To the storage system, updating the metadata "deletes" or removes the data from being accessed by a host and conventionally appears no different from any other writes or alterations being performed by the host. In the described method an indication is provided by the host that a write relates to host metadata. The indication may be provided by the post attaching a flag to the input/output request when sent to the storage controller. There is limited opportunity for the storage system to prioritize between same-rank (i.e. data vs data or metadata vs metadata) information within the same volume or different volumes as the relationship and structure are not known to the storage controller. Using the indication mechanism shares some of the host information with the storage system.

In process 102, the data of a host input/output write operation that includes an indication that the write stores host metadata in a highly resilient storage area of the storage system. The physical storage data units of stored data of the write are labeled (process 103) as being of priority against deletion. The prioritization may be within a volume or other collection of related data units. The priority label may be a flag, or an identifying tag, or any other indication of prioritization, of the host metadata. Additionally, the priority flag may be stored together with the logical unit number (LUN) of the logical unit of data. Logical block addressing (LBA) remembers the label for future behavior of the data units, such as garbage collection. The label may indicate that the data units relate to host metadata or indicate a priority (without indicating what the data relates to) from deletion relative to other data units of a volume. Modern storage systems often use some kind of internal mapping to describe where a piece of host data is located on the physical media, so the tuple (host LBA, storage LBA) in the described method also stores the priority label indicating whether the host LBA contains host metadata so the storage controller knows to treat the physical placement of it differently, in this context when the storage controller comes to make a decision which physical data to discard first.

In process 104, the user sends a command to delete a volume to the storage controller. In various embodiments, stored data units of the volume that are not priority labeled, as the volumes do not contain host metadata, are deleted before the labeled host metadata data units of the volume. Keeping the priority labeled data units of physical storage maintains a coherent picture of the host metadata even after some of the non-metadata data units have been deleted. A delete process may include: a soft delete stage in which a volume is marked (process 105) for deletion and host input/output operations are blocked to the volume; a compaction stage for compaction of soft deleted extents of the volume; and a hard-delete stage (process 108) in which the storage extents are discarded freeing up the physical storage space.

In the compaction stage, the method collects (process 106) soft deleted data units of the volume into a compacted area with priority labeled data units being compacted together as a group as an extent. The compacting process considers the priority labeling indication that stored data is host metadata (or is not host metadata) as an input for a data placement algorithm so that similar types of data will reside in the same extents. In the hard delete stage, priority labeled extents are prioritized (process 107) to be kept and then deleted (process 108) based on the prioritization. The storage system knows that a piece of metadata or data belongs to a specific volume because when written the volume/LUN information is attached to the input/output operation by the host. The method receives (process 109) a host volume restore command for a previously deleted host volume and restores the priority labeled extents in order to resolve any permanently deleted (i.e., hard deleted) data extents.

In various embodiments, the storage controller couples previously separated elements in the storage environment: host metadata and physical placement tuple. The storage controller discards unused data to allow a more reliable restoration and salvaging of deleted data where a delete decision is requested to be reverted. Embodiments of the present invention provide improvements when trying to salvage a volume from a user error or for data forensic analysis of a storage device maintained by the storage controller.

In various embodiments, a delete process performed by a storage controller includes multiple steps involving a soft deletion step, a compaction step, and a hard deletion step (or alternatively a restoration step).

Soft delete: A volume is marked for deletion, i.e. soft deleted. Host input/output operations to the volume are blocked. The storage controller may assign a time-to-live (TTL) value to the deletion event. The storage controller may manage the time between the soft delete and the subsequent hard-delete with a time-to-live (TTL) or hop limit. The TTL may be implemented as a counter or timestamp attached to or embedded in the data volume to be deleted or its metadata.

Compaction: The garbage collection (GC) is modified so as to recognize and behave differently when it encounters an as yet uncompacted, but soft-deleted, volume. On encountering the first data unit of the soft deleted volume, the GC collects the soft deleted volume's data units into a designated, compacted area of storage. The storage controller may designate a dedicated contiguous block in the address range for compacted volumes (i.e. those which have been soft deleted but not yet hard deleted) or the compacted volumes may be stored with address blocks located in active volumes. Once compaction has been completed, the TTL parameter are monitored. Since the compaction involves moving the volume's data units, the storage controller's metadata for the volume are also updated, in order to retain the option of restoring the volume.

In the described method and system, the compaction includes compacting host metadata as grouped storage extents and other data of the volume as separately grouped storage extents.

When a hard-delete step is performed, the volume will have likely been part of a prior soft-delete step and will therefore already have been compacted, thereby making its hard deletion easier and quicker to carry out. Moreover, in the interim period between compaction and hard deletion, the soft deleted volume is stored more space efficiently and in a way that reduces the resources that are required to keep knowledge of the soft deleted volume.

Permanent/hard delete: The compacted volume is discarded, thus freeing up physical storage space. In the described method and system, the non-host metadata storage extents of a volume are discarded first thereby prolonging a possible recovery time for the volume as the host metadata is maintained until the last possible time.

A permanent or hard delete can be triggered by several reasons, for example, demand for additional storage space, as a result of a policy that carries out a hard delete once the TTL has elapsed, or as a result of a policy created to comply with regulatory provisions or other rules. When a hard delete occurs, the previously compacted data can be easily discarded, thus freeing up space in the storage system.

Once the prescribed event has occurred or elapsed, the storage controller hard deletes the previously soft deleted volume. In the regulatory scenario, the hard delete may comprise wiping the physical storage associated with the physical address space of the deleted volume's data units (e.g., in the case of a magnetic storage medium by an overwrite with null data) thereby precluding later a physical recovery of the data units. In a storage space-management scenario, the hard delete may only remove protection or allocation from the address space to be recycled, so that the host is able to overwrite the data in the address space that was permanently deleted.

At any time up to the hard delete, restoration is possible. A restoration step may be as follows:

Restoration: The soft deleted volume is restored by recreating the volume in the storage system and reapplying the volume's stored metadata.

In the proposed three-step deletion process, the volume remains recoverable, i.e. restorable, up to the hard delete. The compaction also makes the hard delete quicker and simpler, so that the space is freed up much more quickly than if the soft deleted volume data were still fragmented over the physical storage.

Referring to FIGS. 2A to 2E, schematic diagrams 210, 220, 230, 240, 250 illustrate the described method as carried out in a virtualized storage system. The storage system includes a storage controller 204, which controls the virtualization of underlying physical storage 205. Host application send input/output operations to the storage controller for host volumes 201, 202, 203.

Figure 2A:
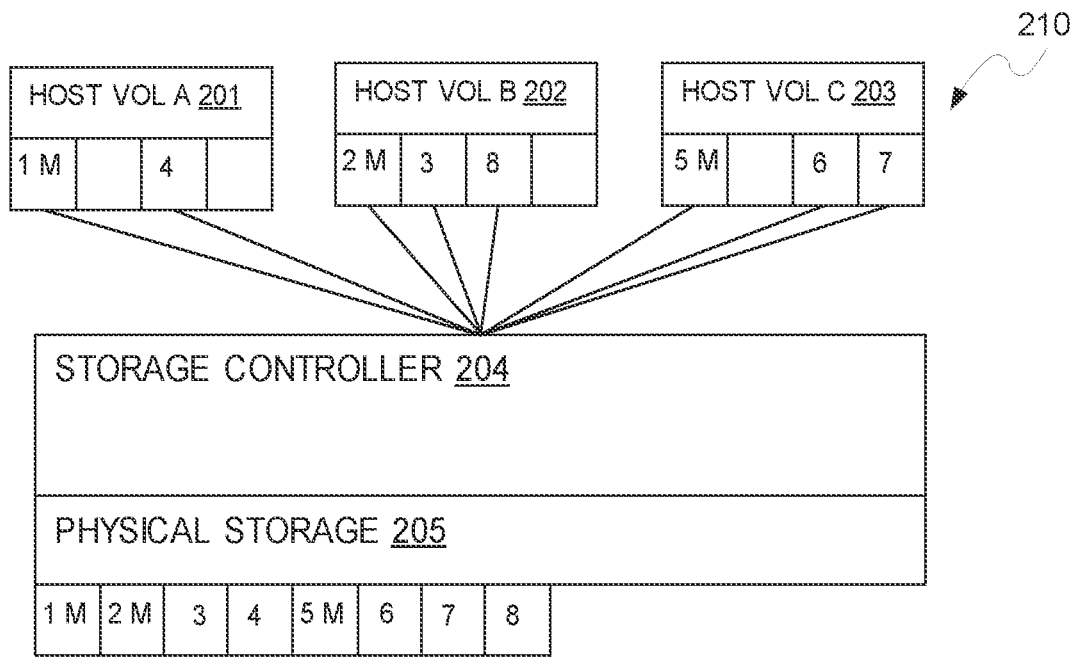
FIGS. 2A to 2E are schematic diagrams illustrating a method in accordance with the present invention.

FIG. 2A shows host volumes 201, 202, 203 writing data to the storage controller 204. Host metadata writes include an indication that the data includes host metadata (this is illustrated with the "M" shown in the data writes, for example, "1M" from host volume A 201, "2M" from host volume B 202, and "5M" from host volume C 203). The storage controller 204 interleaves the data in physical storage 205 extents.

Figure 2B:
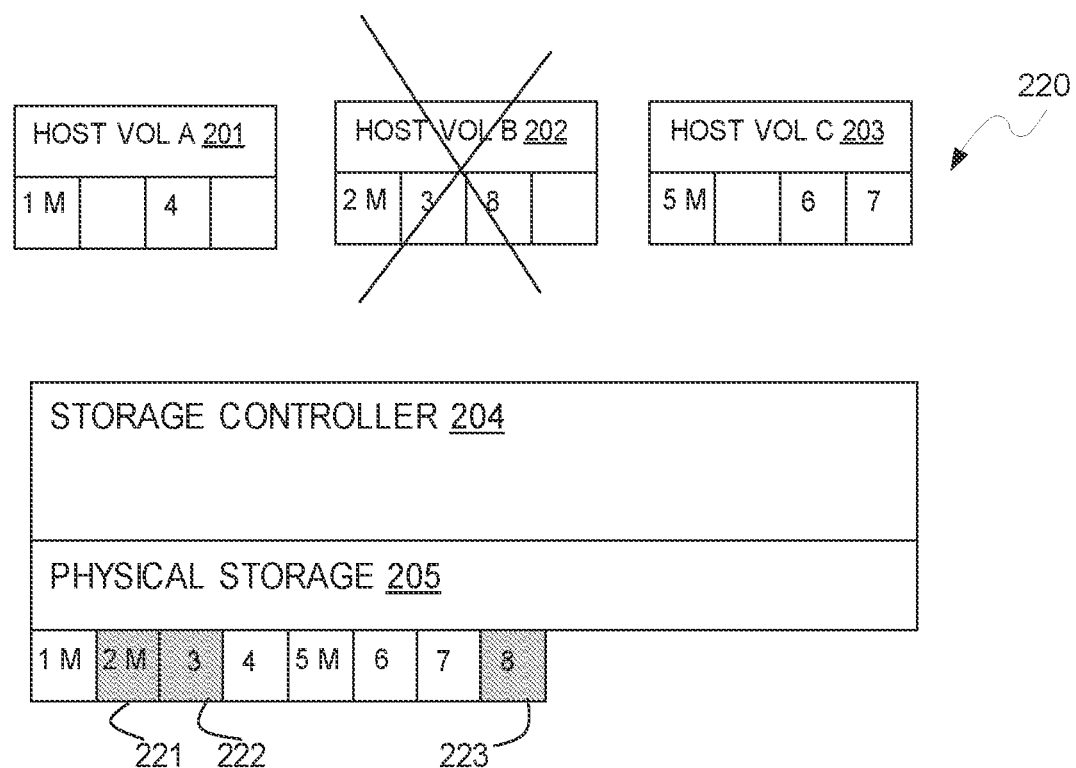

FIG. 2B shows that host volume B 202 is marked for deletion. The storage controller 204 identifies the physical storage allocated for the deleted volume, in this example extents "2M" 221, "3" 222 and "8" 223 shown in hatched shading.

Figure 2C:
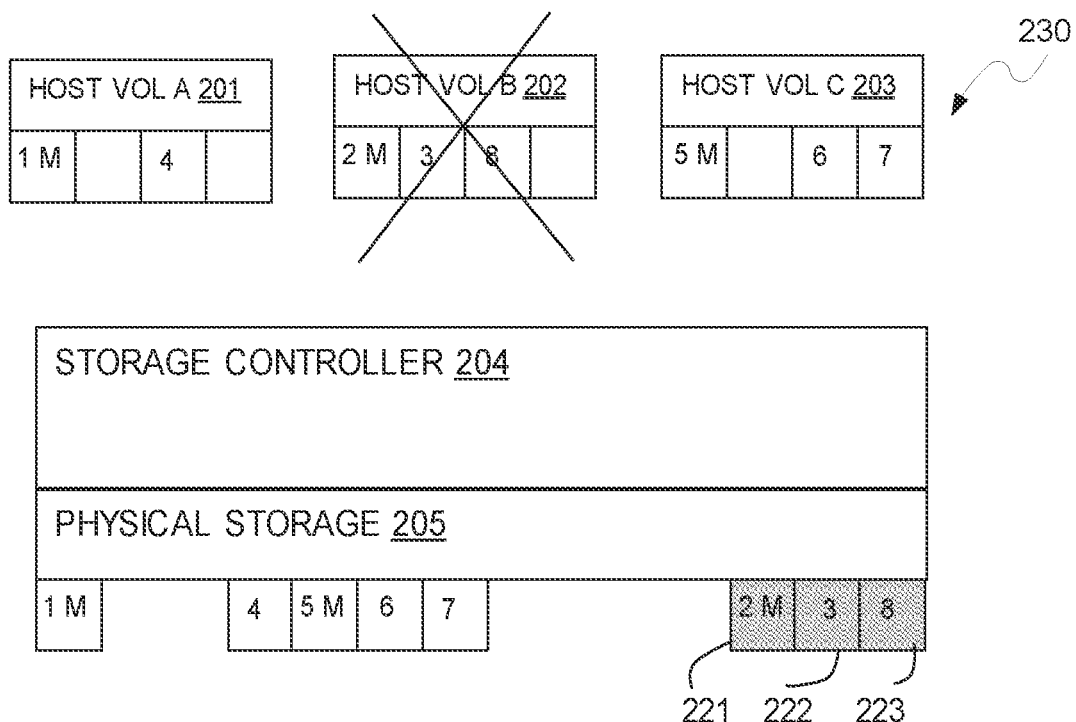

FIG. 2C shows that the storage controller 204 migrates the data 221, 222, 223 of deleted host volume B 202 to an area ready for cheap collection as part of a contraction stage of a soft delete process.

Figure 2D:
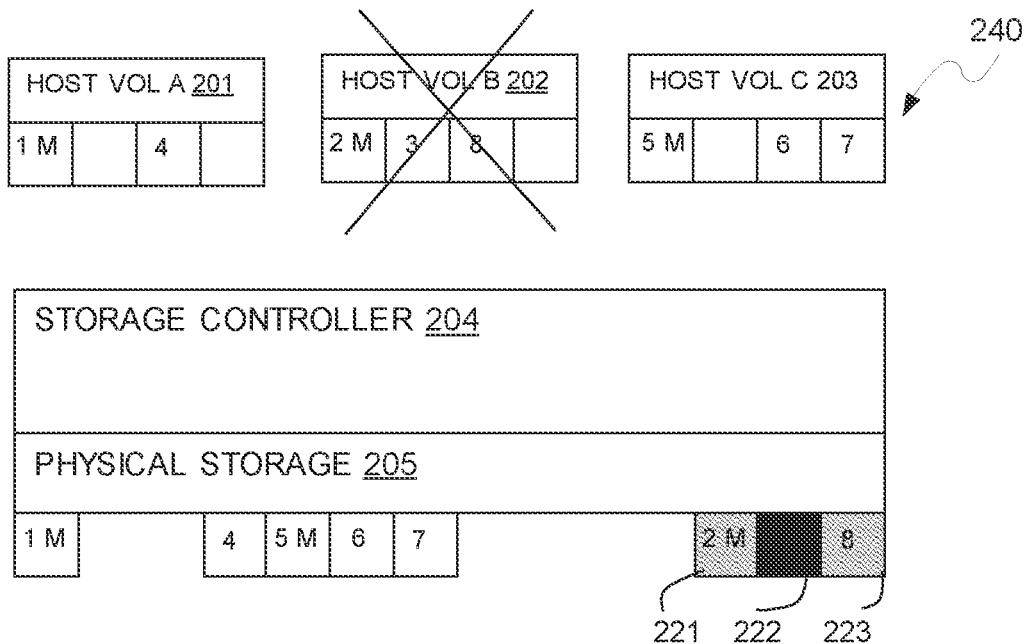

FIG. 2D shows that the storage controller 204 will select a non-metadata extent 222 for discarding as part of the hard-delete stage.

Figure 2E:
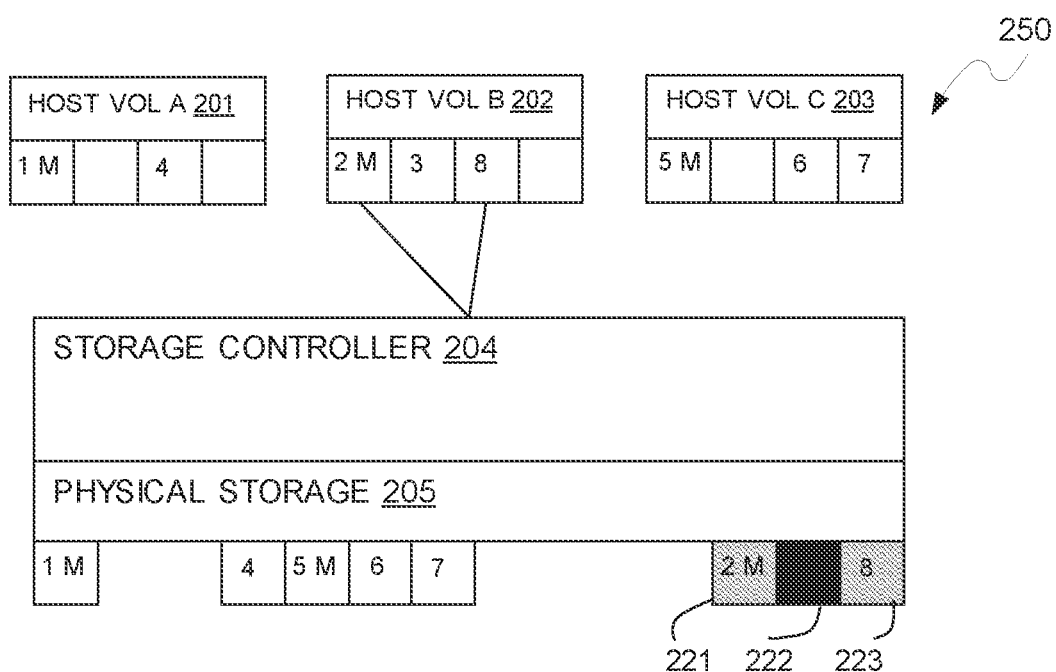

FIG. 2E shows a scenario in which the user identifies that host volume B 202 was wrongly deleted and un-deletes it. The host tries to access the host volume B 202 and, in order to resolve the physical address file system, access to the host metadata is required. The host accesses a piece of host metadata "2M" 221 that still exists on the physical storage 205. From the host metadata "2M" 221, the host can resolve the physical location required to access the data asked for by the host.

Soft delete is a property of a system that allows a deleted object to be restored if the action was done by mistake or as a result of malicious act. There is then a point where the system decides to hard-delete and discard the data, for example, due to space considerations. In the prior art, as the order of discarding the storage extents is undetermined, the user can end up in a situation where the data is still physically present on the underlying storage but the metadata (for example, the file system structure) is gone and therefore reviving the volume becomes unrealistic or extremely complicated. The described method prevents this issue by ensuring that the host metadata is the last data of the volume to be hard-deleted.

Embodiments of the present invention provide different importance levels of data within a volume, allowing more important data to survive for longer thereby giving the system, or an external tool, a better chance of recovering useful information.

The host can provide to the storage controller some indications regarding the nature of the input/output writes and some guidelines for processing it. The storage controller in turn will implement the writing and storage of data based on these indications. A possible indication may be "metadata", which the host can attach to metadata writes that are, for example, part of the file system structure. The storage controller can then store this data in a highly resilient tier under normal circumstances. In addition, the storage controller remembers that a logical block address (LBA) had such indication attached to so the storage controller can maintain this behavior over garbage collection operations, etc.

When a volume gets soft deleted, the storage controller moves all the data associated with the volume into a set of physical extents so future hard deletes (for example, as a result of a capacity pressure) can easily discard one or more of these extents quickly without requiring a significant amount of processing. The described method includes the process of moving the data considering a "metadata" indication and grouping these areas together. This also results in areas not marked as such as being grouped together as well.

Upon selecting an extent to discard, the system can then bias in favor of keeping soft deleted host metadata extents over other extents. This results in the system maintaining a coherent picture of host metadata even after some data extents have been discarded. As modern file systems can usually survive loss of data within files, this allows the user to revive a volume that was subjected to soft delete by error and maintain access to at least some of the data.

The described method and system relate to preserving host metadata using indication and does not discuss metadata required by the storage controller to resolve virtual addresses location. This kind of metadata is already known to the storage controller and does not required any additional input from the host in order to preserve it.

Figure 3:
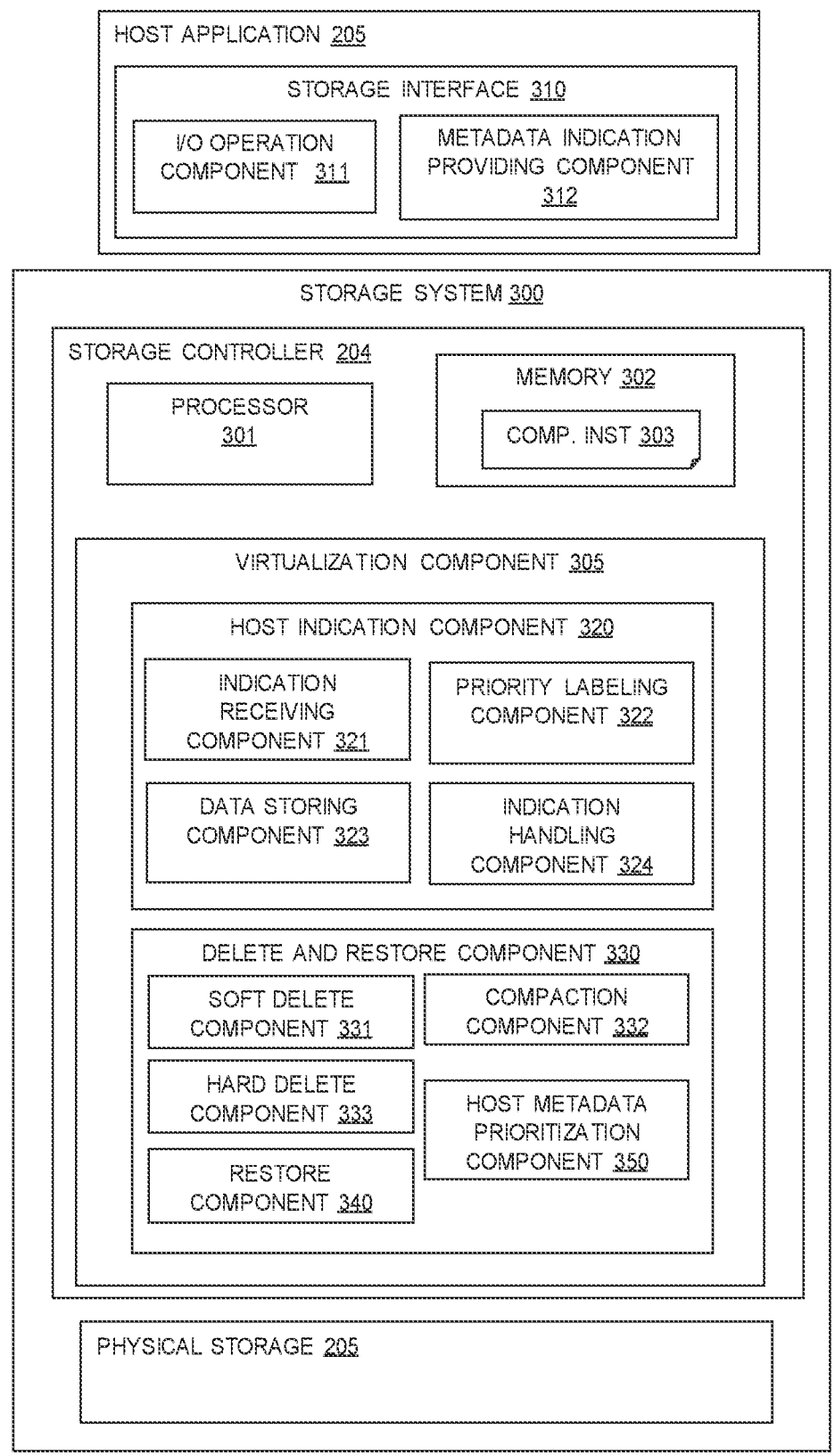
FIG. 3 is block diagram of an example embodiment of a system in accordance with the present invention.

Referring to FIG. 3, a block diagram shows an example embodiment of a storage system 300 in which the described system may be implemented.

The storage system 300 receives data from host applications 201 that have a storage interface 310 including an input/output operation component 311. In this described system, the storage interface 310 also includes a metadata indication providing component 312 for providing an indication attached to host input/output write operations that include host metadata writes.

The storage system 300 includes a storage controller 204 that includes a virtualization component 305 for providing a virtual address space for data stored in physical storage 205 of the storage system 300. The storage controller 204 includes at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components.

The virtualization component 305 of the storage controller 204 provides the host metadata prioritization functionality for the method described herein. The virtualization component 305 includes a host indication component 320 including a host indication receiving component 321 for receiving a host input/output write operation including an indication that the write relates to host metadata and a priority labeling component 322 for priority labeling physical storage data units of data of the write as being prioritized to be kept during a delete process compared to unlabeled data units.

The host indication component 320 includes a data storing component 323 and an indication handling component 324 for storing data of a host input/output write operation that includes an indication that the write relates to host metadata in a highly resilient storage area.

The virtualization component 305 includes a delete and restore component 330 for receiving a host volume delete command and handling permanent deleting of data units of the volume that are not priority labeled before the priority labeled data units of the volume.

The delete handling component 330 includes a soft delete component 331, a compaction component 332 for compaction of soft deleted extents, and a hard delete component 333. The compaction component 332 handles priority labeled data units to compact them together as a data extent. The hard delete component 333 hard-deletes compacted extents that are not priority labeled before the priority labeled soft deleted extents.

The delete and restore component 330 also includes a restore component 340 for receiving a host volume restore command for a previously deleted host volume and restoring the priority labeled data units and resolving any permanently deleted data units.

The delete handling component 330 includes a host metadata prioritization component 350 for handling the host metadata during the compaction by the compaction component 332, prioritizing host metadata by during the hard delete by the hard delete component 333, and restoring the host metadata during the restoration by the restore component 340.

Figure 4:
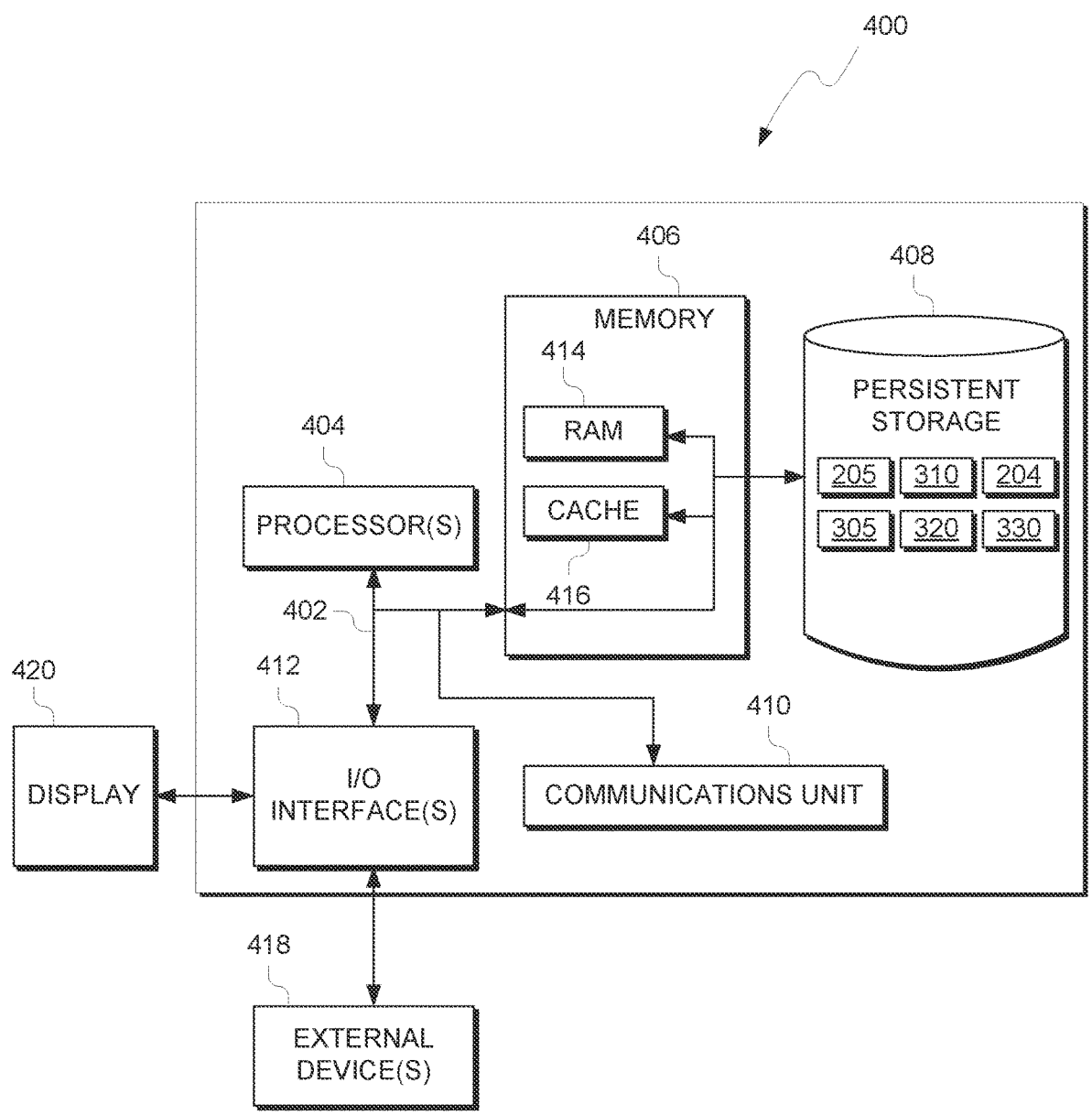
FIG. 4 is a block diagram of an embodiment of a computer system or cloud server in which the present invention may be implemented.

FIG. 4 depicts a block diagram of components of computing device 400, such as storage controller 204, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Storage interface 310, Storage controller 204, physical storage 205, virtualization component 305, host indication component 320 and delete and restore component 330 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of cloud computing environment 50. In these examples, communications unit 410 includes one or more network interface cards. Communications unit 410 may provide communications through the use of either or both physical and wireless communications links. Storage interface 310, Storage controller 204, physical storage 205, virtualization component 305, host indication component 320 and delete and restore component 330 may be downloaded to persistent storage 408 through communications unit 410.

I/O interface(s) 412 allows for input and output of data with other devices that may be connected to computing device 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., Storage interface 310, Storage controller 204, physical storage 205, virtualization component 305, host indication component 320 and delete and restore component 330, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
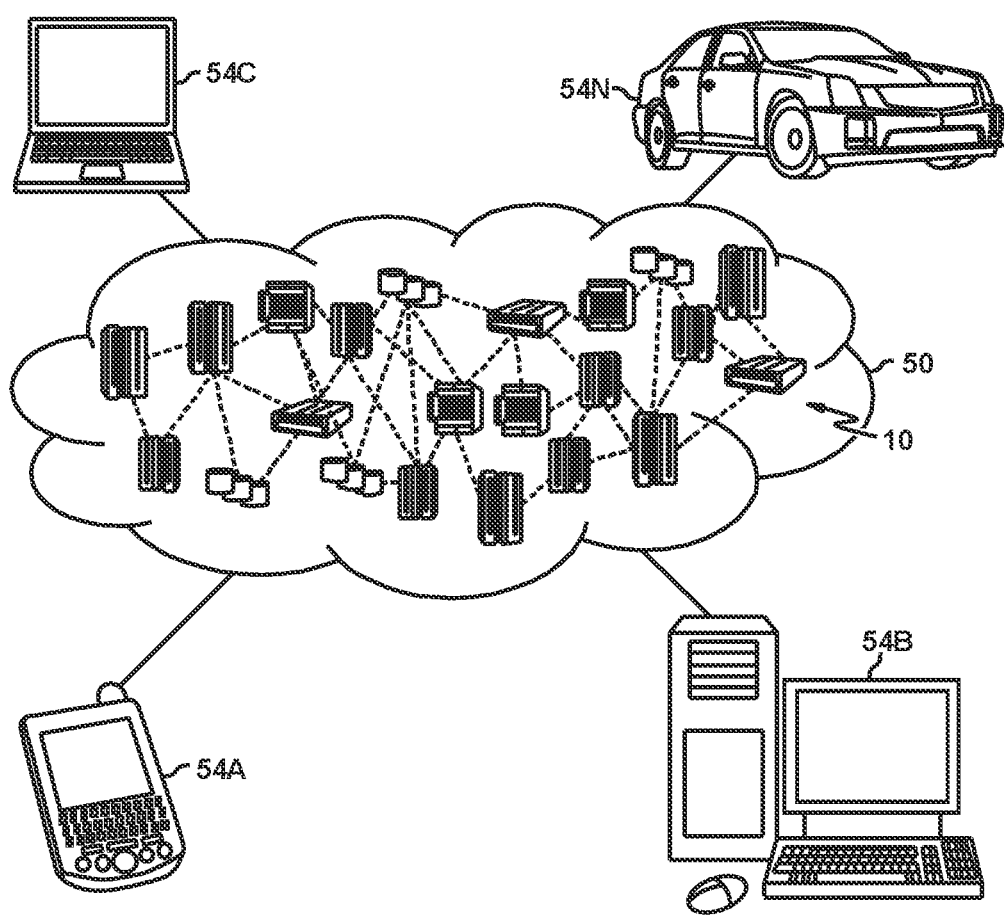
FIG. 5 is a schematic diagram of a cloud computing environment in which the present invention may be implemented.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
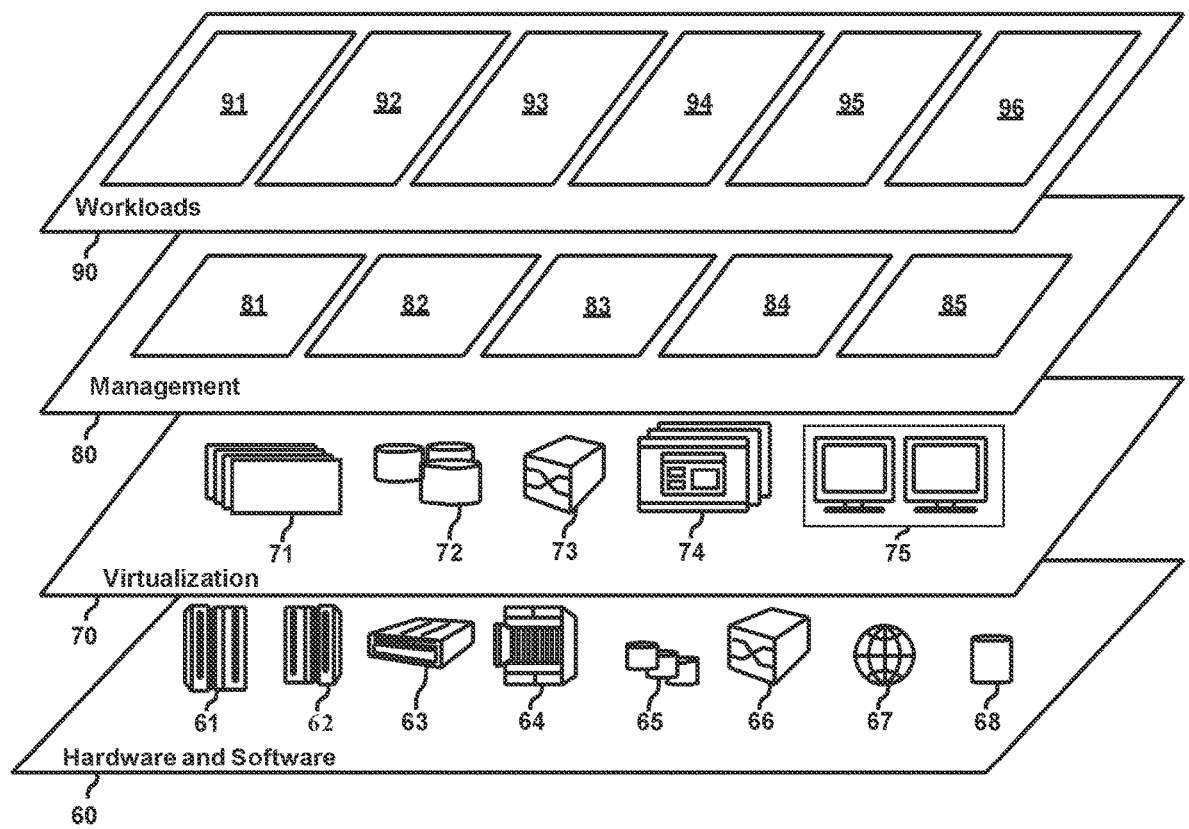
FIG. 6 is a diagram of abstraction model layers of a cloud computing environment in which the present invention may be implemented.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage system controller processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A method comprising:
   receiving, by one or more processors, a host input/output write operation, wherein the host input/output write operation includes host metadata regarding data represented by the host input/output write operation;
   storing, by the one or more processors, the host input/output write operation in one or more physical storage data units;
   assigning, by the one or more processors, a priority to the one or more physical storage data units;
   in response to receiving a host volume delete command associated with at least one of the one or more physical storage data units, prioritizing, by the one or more processors, data units of the host volume for deletion based, at least in part, on the assigned priority of the data units of the host volume, wherein data units with a higher priority are soft-deleted; and
   in response to receiving a restore host volume command for a soft-deleted data unit, restoring, by the one or more processors, the soft-deleted data-unit based on the host metadata.

2. The method of claim 1, wherein the host input/output write operation includes a flag attached to the write operation by the host application.

3. The method of claim 1, wherein the priority of the one or more physical storage data units includes storing a priority label in an internal physical data address mapping of a storage controller.

4. The method of claim 3, wherein the higher priority labeled data units are compacted together as an extent in response to the volume delete command.

5. The method of claim 4, wherein the delete process includes hard-deleting compacted extents of a volume that are a lower priority than soft deleted extents of the volume.

6. The method of claim 1, wherein host metadata includes metadata relating to the host file system structure.

7. A computer program product comprising:
   one or more computer-readable storage media and program instructions stored on the one or more computer-readable storage media, the program instructions comprising:
     program instructions to receive a host input/output write operation, wherein the host input/output write operation includes host metadata regarding data represented by the host input/output write operation;
     program instructions to store the host input/output write operation in one or more physical storage data units;
     program instructions to assign a priority to the one or more physical storage data units;
     in response to receiving a host volume delete command associated with at least one of the one or more physical storage data units, program instructions to prioritize data units of the host volume for deletion based, at least in part, on the assigned priority of the data units of the host volume, wherein data units with a higher priority are soft-deleted; and
     in response to receiving a restore host volume command for a soft-deleted data unit, program instructions to restore the soft-deleted data-unit based on the host metadata.

8. The computer program product of claim 7, wherein the host input/output write operation includes a flag attached to the write operation by the host application.

9. The computer program product of claim 7, wherein the priority of the one or more physical storage data units includes storing a priority label in an internal physical data address mapping of a storage controller.

10. The computer program product of claim 9, wherein the higher priority labeled data units are compacted together as an extent in response to the volume delete command.

11. The computer program product of claim 10, wherein the delete process includes hard-deleting compacted extents of a volume that are a lower priority than soft deleted extents of the volume.

12. The computer program product of claim 7, wherein host metadata includes metadata relating to the host file system structure.

13. A computer system comprising:
one or more computer processors;
one or more computer readable storage media; and
program instructions stored on the computer readable storage media for execution by at least one of the one or more processors, the program instructions comprising:
program instructions to receive a host input/output write operation, wherein the host input/output write operation includes host metadata regarding data represented by the host input/output write operation;
program instructions to store the host input/output write operation in one or more physical storage data units;
program instructions to assign a priority to the one or more physical storage data units;
in response to receiving a host volume delete command associated with at least one of the one or more physical storage data units, program instructions to prioritize data units of the host volume for deletion based, at least in part, on the assigned priority of the data units of the host volume, wherein data units with a higher priority are soft-deleted; and
in response to receiving a restore host volume command for a soft-deleted data unit, program instructions to restore the soft-deleted data-unit based on the host metadata.

14. The computer system of claim 13, wherein the host input/output write operation includes a flag attached to the write operation by the host application.

15. The computer system of claim 13, wherein the priority of the one or more physical storage data units includes storing a priority label in an internal physical data address mapping of a storage controller.

16. The computer system of claim 15, wherein the higher priority labeled data units are compacted together as an extent in response to the volume delete command.

17. The computer system of claim 16, wherein the delete process includes hard-deleting compacted extents of a volume that are a lower priority than soft deleted extents of the volume.

* * * * *